(12) United States Patent
James, Jr.

(10) Patent No.: US 6,764,039 B1
(45) Date of Patent: Jul. 20, 2004

(54) APPARATUS FOR RAPIDLY LAYING, RETRIEVING, AND SECURING GROUND COVERS

(76) Inventor: Forrest Hood James, Jr., 2191 Ivy Creek Church Rd., Rutledge, AL (US) 36071

( * ) Notice: Subject to any disclaimer, the term of this patent is extended or adjusted under 35 U.S.C. 154(b) by 0 days.

(21) Appl. No.: 10/378,778

(22) Filed: Mar. 4, 2003

(51) Int. Cl.$^7$ ............................................... B65H 75/42
(52) U.S. Cl. ....................... 242/403; 242/557; 242/919; 405/129
(58) Field of Search ................................ 242/403, 557, 242/919; 405/128, 129

(56) References Cited

U.S. PATENT DOCUMENTS

| | | | |
|---|---|---|---|
| 987,593 A | 3/1911 | O'Maley | |
| 1,550,082 A | 1/1925 | Lintz et al. | |
| 2,616,636 A | 11/1952 | Aden | |
| 3,332,827 A | * 7/1967 | Griffith et al. | 242/557 |
| 3,403,870 A | 10/1968 | Garaboux | |
| 3,473,755 A | 10/1969 | Brown | |
| 3,481,556 A | 12/1969 | McDonnell | |
| 3,880,305 A | 4/1975 | Van Polen | |
| 3,913,854 A | * 10/1975 | McClure | 242/403 |
| 4,024,970 A | 5/1977 | Schirer | |
| 4,044,963 A | 8/1977 | Hostetler | |
| 4,049,140 A | 9/1977 | Roose | |
| 4,084,763 A | 4/1978 | Zamboni | |
| 4,114,855 A | * 9/1978 | Adamson | 254/382 |
| 4,253,619 A | 3/1981 | Corderoy et al. | |
| 4,280,777 A | 7/1981 | Gray | |
| 4,339,096 A | 7/1982 | May | |
| 4,456,399 A | * 6/1984 | Conover | 242/557 |
| 4,460,433 A | * 7/1984 | Boyd | 242/557 |
| 4,494,707 A | 1/1985 | Niibori et al. | |
| 4,513,530 A | 4/1985 | Nyboer | |
| 4,555,073 A | 11/1985 | Barazone | |
| 4,632,329 A | * 12/1986 | Burley | 242/403 |
| 4,742,970 A | * 5/1988 | Barazone | 242/403 |
| 4,754,815 A | 7/1988 | Brouwer et al. | |
| 5,215,278 A | 6/1993 | Hess | |
| 5,425,143 A | * 6/1995 | Kalandovsky | 242/403 |
| 5,524,302 A | 6/1996 | Ragsdale et al. | |
| 5,536,116 A | 7/1996 | Lammers et al. | |
| 5,620,281 A | * 4/1997 | Lammers et al. | 405/129 |
| 5,709,351 A | 1/1998 | Osborn et al. | |
| 5,897,073 A | 4/1999 | McVaugh | |
| 6,299,094 B1 | * 10/2001 | James | 242/919 |
| 6,575,393 B1 | * 6/2003 | James | 242/919 |

FOREIGN PATENT DOCUMENTS

| | | | |
|---|---|---|---|
| DE | 3838628 A 1 | 5/1990 | |
| GB | 2205814 | * 12/1988 | 242/919 |

* cited by examiner

Primary Examiner—John M. Jillions
(74) Attorney, Agent, or Firm—Lanier Ford Shaver & Payne P.C.

(57) ABSTRACT

An apparatus for rapidly laying down or retrieving a ground cover while simultaneously laying down or retrieving heavy chains and the like used to secure the ground cover onto the ground. The apparatus of the present invention can lay down or retrieve 3,500 feet or more of ground cover and heavy chains at a rate of at least about 100 feet per minute or more.

64 Claims, 7 Drawing Sheets

APPARATUS FOR RAPIDLY LAYING, RETRIEVING, AND SECURING GROUND COVERS

BACKGROUND OF THE INVENTION

1. Field of the Invention

This invention relates generally to machines using cover reels for laying down and taking up ground covers and particularly to a machine that rapidly lays down a ground cover on a road while simultaneously securing the cover to the road with chains, and rapidly retrieving the cover and chains for reuse.

2. Description of the Prior Art

Numerous machines have been described which use reel mechanisms to lay down covers on the ground and take them up. Some of these have been for covering baseball fields, football fields, new-laid concrete, winter recreation surfaces, and land fills. Some machines have been described for laying down or taking up plastic piping or grass turf. These machines have no means to rapidly secure the ground cover on the ground with chains or similar material and to rapidly retrieve the ground cover and chains. In road construction industry, rain can wet a road surface under construction to the point where further construction is not possible until the road dries. It may take several days, after a rainfall, for a road to dry out enough to resume construction.

There exists a need for a practical apparatus that can apply and secure a cover to a road construction site quickly to protect it from weather and other environmental conditions, and rapidly (within a few minutes) retrieve the cover for reuse and allow work to resume. However, in windy conditions it is necessary to weight or secure the cover to the ground as the cover is being laid on the ground. Also, it is necessary to remove the cover from the ground to the cover reel with minimum space between the two because, if wind gets under the cover the wind will blow the cover off center, twist it, and disrupt rewinding or laying down the cover. The present invention provides a novel, practical means for meeting these needs and will, thus, save considerable time and expense by reducing the interference of inclement weather with road construction.

SUMMARY OF INVENTION

The present invention is an apparatus for rapidly laying down or retrieving a ground cover while simultaneously laying down or retrieving retaining material, such as heavy chains, for securing the ground cover onto the ground. The apparatus is useful for laying a cover over a road, dam, or building construction site within a few minutes to protect the construction site from rainfall reducing the damage, delay, and cost it causes. It is, thus, also useful for preventing construction delays due to rainfall at road construction sites, prior to laying asphalt or concrete. The cover can then be rapidly retrieved within a few minutes by the apparatus when there is no longer a threat of rain so work can continue without costly delay. In a preferred embodiment, the invention has a frame which is attached rotatably to a prime mover such as a forklift or tractor. The frame has support arms which support a cover reel. Raising and lowering means are connected between the prime mover and frame to raise and lower the frame and cover reel, preferably by rotating the frame downward or upward. Chain reels or sprockets, with a motor/transmission assembly, and containers are located on the prime mover or frame for winding or unwinding the anchor chains.

The cover on the reel can be lowered to the ground or close to the ground and laid onto the ground rapidly by the action of the prime mover pushing the cover reel forward, freely unwinding the cover from the cover reel which has adjustable hydraulic drag to prevent backlash. The chains will unwind freely from the containers behind the cover reel through a series of guide rollers and onto the cover serving to hold the cover in a fixed position on the ground. The cover can be rewound and taken up onto the cover reel in a similar manner. The cover is attached to the cover reel and is then pushed forward by the prime mover, rapidly winding up the cover as the cover reel rotates. Simultaneously, the chains are taken up by the chain reels or sprockets which are rotated by a motor/transmission assembly. In both procedures of rapidly laying down or taking up the cover, a downward pressing force can be applied to the cover reel by the raising and lowering means to facilitate winding, unwinding, or alignment of the cover on the ground, or the weight of the cover reel and frame alone may be sufficient for these purposes. Alternatively, the cover reel can be power driven to adjust drag and tension in the cover during laying down and retrieval.

An advantage of the present invention is a cover reel assembly that can apply and secure a cover with heavy securing chains to the ground at a rate of 100 feet per minute or more.

Another advantage of the present invention is a cover reel assembly that can take up a cover and heavy securing chains from the ground at a rate of 100 feet per minute or more.

Another advantage of the present invention is a cover reel assembly that can lay down and retrieve the cover and heavy securing chains without the occurrence of backlash or wrinkles in the cover.

Another advantage of the present invention is reducing lost time from rain and "conditions too wet to work" during construction.

Another advantage of the present invention is a cover reel assembly that can provide a cover which will heat and insulate the road therefore allowing work to continue in freezing or near freezing weather.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
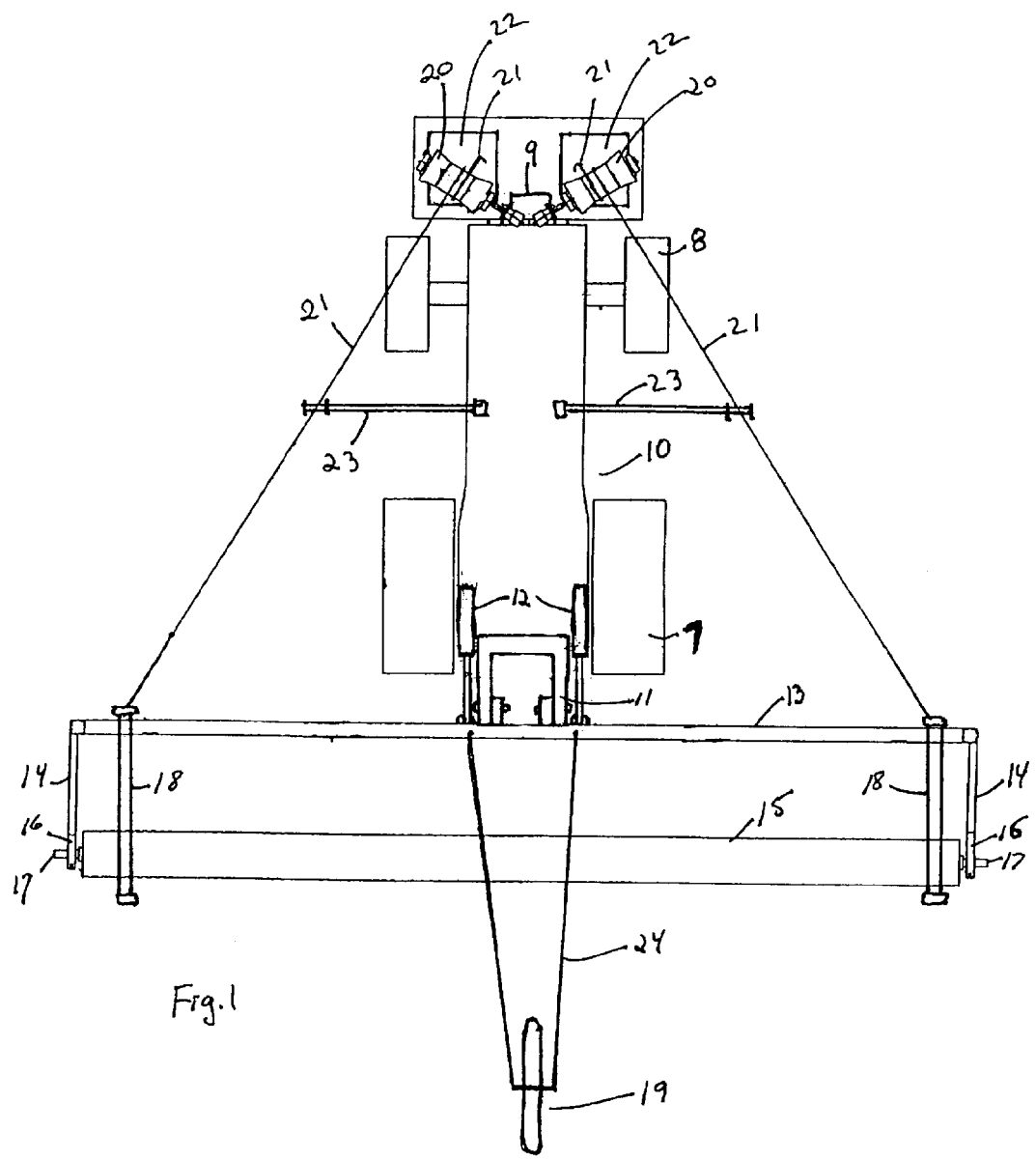
FIG. 1 shows a top view of the apparatus of the present invention.

FIG. 1 shows a top view of the ground cover dispensing and retrieving mechanism of the present invention. Prime mover 10, preferably a tractor or fork lift with front wheels 7 and back wheels 8, has brace extensions 11, or any other suitable mechanism, at the front end of the prime mover 10 to which a ground cover dispensing and retrieving mechanism is attached. The ground covering dispensing and retrieving mechanism includes, preferably, a frame 13 attached rotatably to brace extensions 11 on prime mover 10. Frame 13 has arms 14, with arms 14 having first ends attached to frame 13 and opposite ends which hold a cover reel 15 reversibly and rotatably. Cover reel 15 is held reversibly and rotatably by a split bushing 16 which accommodates a roller bearing (or shaft) 17 attached to cover reel 15. Split bushing 16 is located at the opposite end of arm 14. Frame 13 also has top chain guides 18 near the ends of frame 13.

Figure 2:
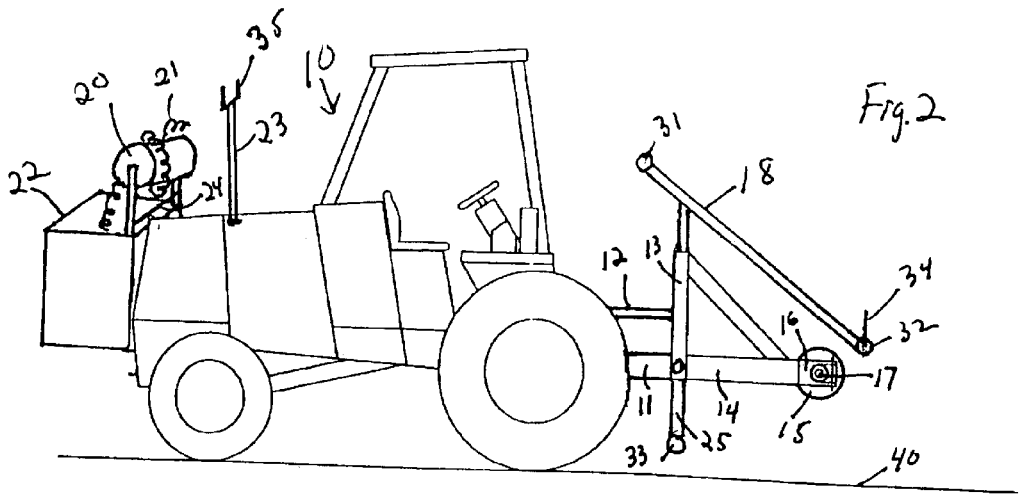
FIG. 2 shows a side view of the apparatus of the present invention.

A retaining material delivery and retrieving system to lay or retrieve retaining material is constructed of chain reels or sprockets 20, a motor, transmission, and shaft assembly 9 which actively rotates chain reels 20 in a clockwise or counterclockwise direction, retaining material receptacles 22 located at the back end of prime mover 10, top retaining material guides 18, lateral material retaining guides 23, and bottom chain guides 25 (see FIG. 2).

Ground cover retaining material is, preferably, constructed of anchor chains 21 which are contained in retaining material receptacles 22 at the back end of prime mover 10. Anchor chains 21 can be extended to top retaining material (chain) guides 18 on frame 13 by being coiled one or more times around chain reels 20, passing through lateral material retaining (chain) guides 23, and then to top retaining material (chain) guides 18. Alternatively, chains 21 may extend to top chain guides 18 without passing through lateral chain guides 23. It was discovered, surprisingly, that when chain 21 is coiled completely around (360°) chain reel 20, chain reel 20 can pickup any length of heavy chain from the ground and deposit it in chain receptacles 22 simply by the rotation of chain reel 20 produced by motor, shaft, and transmission assembly 9. Chain reel 20, preferably has three dividers or fins on the reel to keep the chain from binding (not shown).

Prime mover 10 has raising and lowering means 12 attached rotatably to frame 13. Frame 13 and cover reel 15 are lowered to the ground, preferably, when rotated forward and downward by raising and lowering means 12. Likewise, frame 13 and cover reel 15 are raised above the ground when rotated backward and upward by raising and lowering means 12. Raising and lowering means may be electrical, hydraulic, or pneumatic. The raising and lowering means can be used to hold the cover reel on the ground or the optimum distance above the ground to facilitate winding, unwinding, or alignment of the cover on the ground.

Frame 13 may have a front center guide assembly 19 supported by center guide extensions 24 in order to follow a center line when laying or retrieving the ground cover. The guide assembly 19 can be a wheel which is used to follow a center line to ensure an even laying down or retrieving a ground cover with cover reel 15. Frame 13 may be symmetrical so that all elements on one end of frame 13 are identical to those on the opposite end. This is also the case for chain reels 20 at the back end of the prime mover 10. Chain reels 20 and retaining material receptacles 22 are preferably at the back of prime mover 20 to counter balance the weight of frame 13, cover reel 15, and cover 41 (see FIGS. 3 and 4) at the front of prime mover 10. The total weight of the chains 21 held in receptacles 22 may be up to 4000 lbs. or more.

FIG. 2 shows a side view of the apparatus of the present invention. In this view, frame 13 and cover reel 15 are shown as being held above the ground 40 by raising and lowering means 12. Chain 21 is shown wrapped once around chain reel 20, with one end of chain 21 extending out of chain receptacle 22. The remainder of chain 21 is stored in receptacle 22. Lateral chain guide 23 is shown with guides 35 to hold chain 21 in position. Top chain guide 18, attached to the top of frame 13, is shown having a roller 31 at one end proximal to prime mover 10, and a roller 34 at the opposite end, proximal to cover reel 15. Bottom chain guide 25 is shown attached to the bottom of frame 13 at one end and having a roller 33 at the opposite free end. Bottom chain guide 25 may be attached rotatably and reversibly to frame 13.

Figure 3:
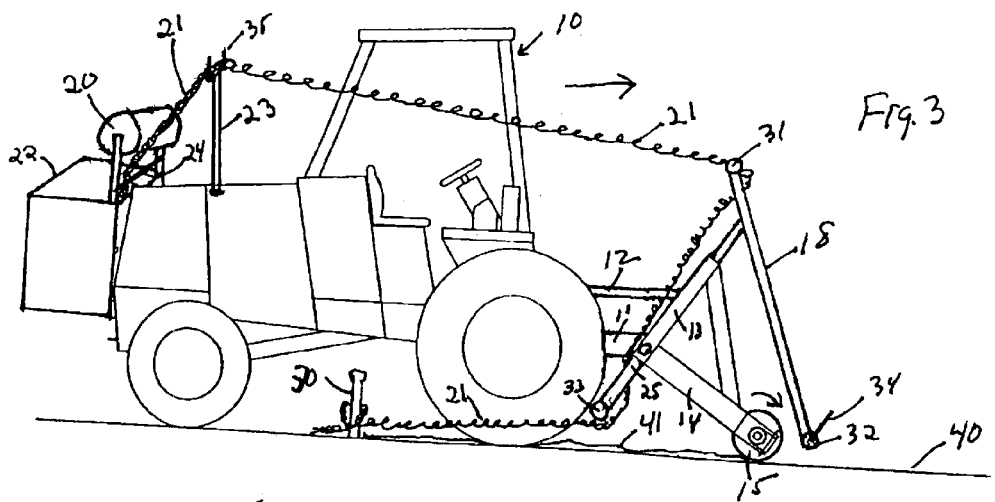
FIG. 3 shows a side view of the apparatus of the present invention with the chains in place for laying the ground cover.

FIG. 3 illustrates how frame 13 and cover reel 15 are rotated forward and downward, when raising and lowering means 12 push frame 13 forward. The apparatus is shown in the mode for laying down ground cover 41 from cover reel 15 onto ground 40, by pushing the cover reel 15 with prime mover 10 and unwinding cover 41 from cover reel 15. The chains are extended out of chain receptacle 22, over chain roller 24 below chain reels 20, through guides 35 on lateral chain guides 23, then extended to roller 31 on top chain guide 18, then extended to roller 33 on bottom chain guide 25, and then attached to ground stake 30. As prime mover 10 pushes forward it unrolls ground cover 41 from cover reel 15 onto ground 40. Simultaneously, chains 21 are pulled out of receptacle 22, rotate around chain roller 24, and are laid down from roller 33 onto ground cover 41 on each edge of cover 41 to secure ground cover 41 to ground 40. In this mode, chain rollers 24 rotate freely to guide the chains towards guide 35 and roller 31 as prime mover 10 pushes forward. Chain reels 20, however, may also be powered to rotate by motor, shaft, and transmission assembly 9. Chains 21 may extend directly from chain roller 24 below chain reel 20 to roller 33 directly from guide 35 to roller 33, but preferably are guided as shown in FIG. 3. Chains 21 are laid onto cover 41 up to 36 inches inward from each edge of the cover 41, preferably from about 14 to about 16 inches, to prevent wind from getting under cover 41 or blowing cover 41 off the ground.

Figure 4:
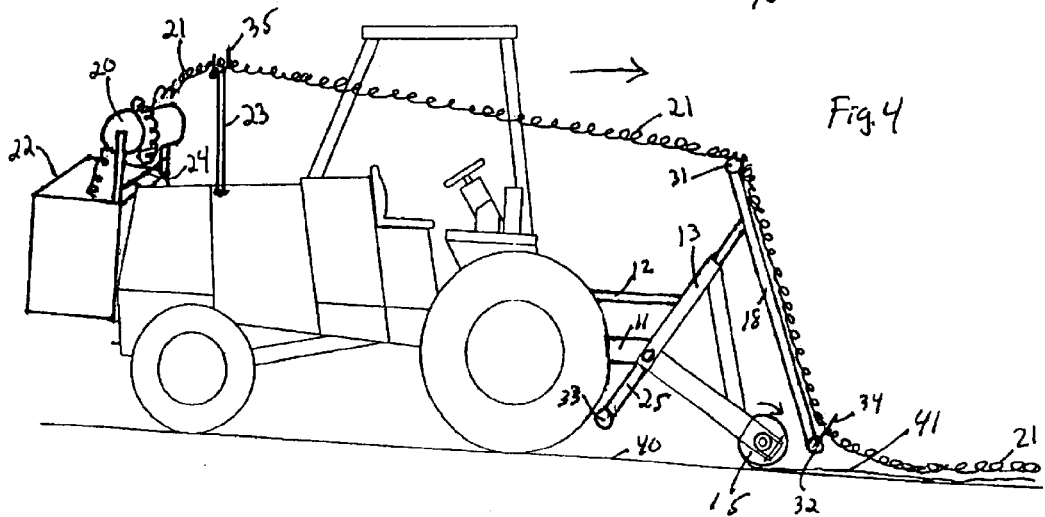
FIG. 4 shows a side view of the apparatus of the present invention with the chains in place for retrieving the ground cover.

FIG. 4 illustrates the apparatus of the present invention in the mode for retrieving ground cover 41 onto cover reel 15 from ground 40, by pushing cover reel 15 with prime mover 10 and winding cover 41 onto cover reel 15. To pick up chains 21 simultaneously while retrieving ground cover 41, chains 21 are extended through guide 34 over roller 32 on top chain guide 18, then extended to roller 31 on top chain guide 18, then to guide 35 on lateral chain guide 23, then around chain reel 20. Chain reels 20 are driven by motor, transmission, and shaft assembly 9 to rotate chain reels 20 at a rate which will pull in chains 21 at a rate similar to the rate at which cover 41 is being retrieved onto cover reel 15. As noted above one to two loops of chain 21 around chain reels 20 having dividers creates sufficient friction to pull chains 21 by rotation of chain reels 20. Chains 21, then, fall passively from chain reels 20 into receptacles 22.

Figure 5:
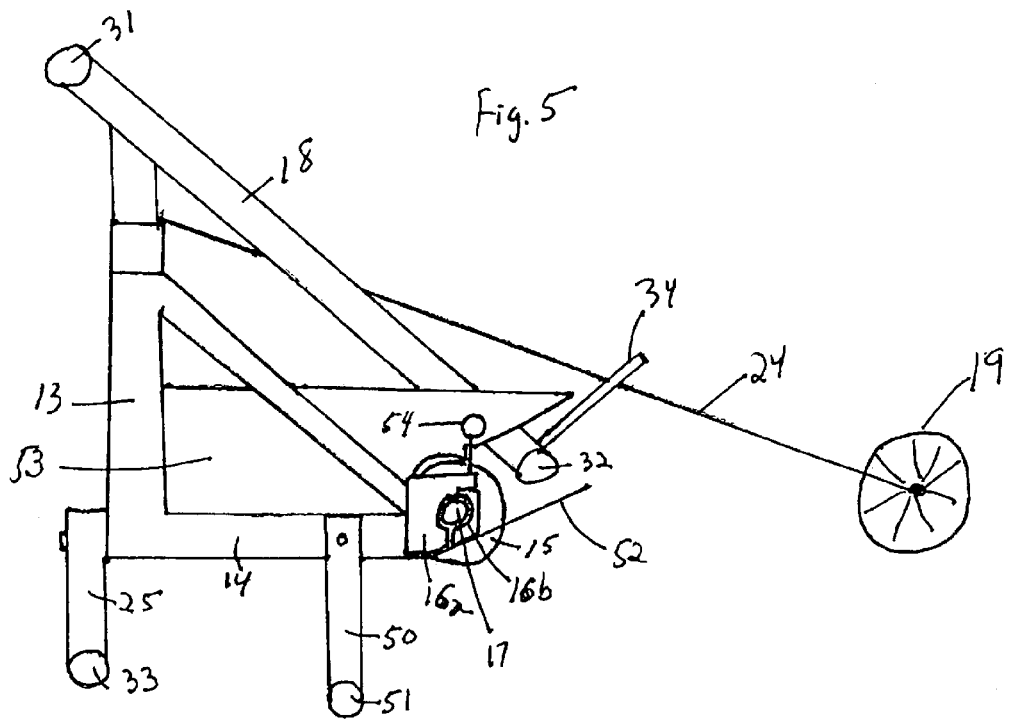
FIG. 5 shows a side view of the frame and cover reel.

FIG. 5 presents a side view of frame 13. Arms 14 at their free opposite end have a split bushing assembly 16, with pieces of assembly 16 shown as 16a and 16b. Piece 16b is held in place by pin 54 which extends through both 16a and 16b. When pin 54 is removed, piece 16b can be removed, and cover reel 15 can be removed from arms 14 of frame 13. When pieces 16a and 16b are held in place by pin 54, they form a bushing 16 whereby a roller bearing 17 or shaft can rotate freely in bushing 16. Since roller bearing 17 is attached to cover reel 15 and forms an axle for cover reel 15, cover reel 15 can rotate freely in bushing 16 by means of roller bearing 17. The free opposite ends of arms 14 may have arm forks 52 which facilitate attaching cover reel 15 to arms 14 by placing arm forks 52 under roller bearings 17 and lifting cover reel 15 from the ground with raising and lowering means 12. Once cover reel 15 is lifted from the ground, roller bearings 17 will roll down arm forks 52 and insert themselves into bushing piece 16a. Bushing piece 16b can then be locked into place to form bushing 16.

Frame 13 may also have a cover reel guide 53 at each end to prevent cover 41 from telescoping on cover reel 15 as cover 41 is being retrieved. Frame 13 may further have a ground cover guide 50 having a drag roller 51 which will hold the edges of the ground cover 15 adjacent to the ground 40, just in front of chains 21, as chains 21 are being laid onto ground cover 41 from roller 33 on bottom chain guide 25. Ground cover guide 50 may be attached reversibly and adjustably to arms 14.

Figure 6:
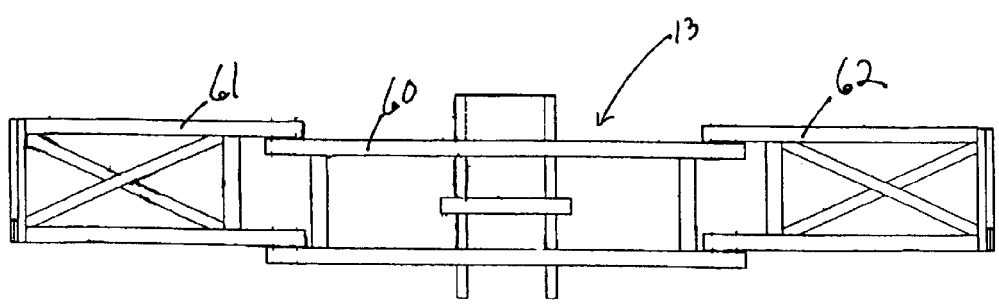
FIG. 6 shows an alternate embodiment of the frame having rotatable or slidable sections.

FIG. 6 illustrates a preferred embodiment of frame 13 of the present invention which is collapsible. Frame 13 is shown as having a center portion 60 and two identical end portions 61 and 62. The end portions 61 and 62 can be mounted to center portion 62 rotatably or slidably. When end portions 61 and 62 are mounted rotatably to center piece 60, they can be rotated inward, away from prime mover 10, so that the overall width of frame 13 is reduced to the width of center piece 60, thereby facilitating transporting the apparatus of the present invention. When end portions 61 and 62 are mounted slidably to center piece 60, they can be telescoped inward, parallel to center piece 60, also facilitating transportation, but also permitting the use of cover reels of variable width. In either mode, pieces 61 and 62 can be reversibly locked into position on center piece 60 by methods known in the art, to prevent rotation or sliding during use.

Figure 7A:
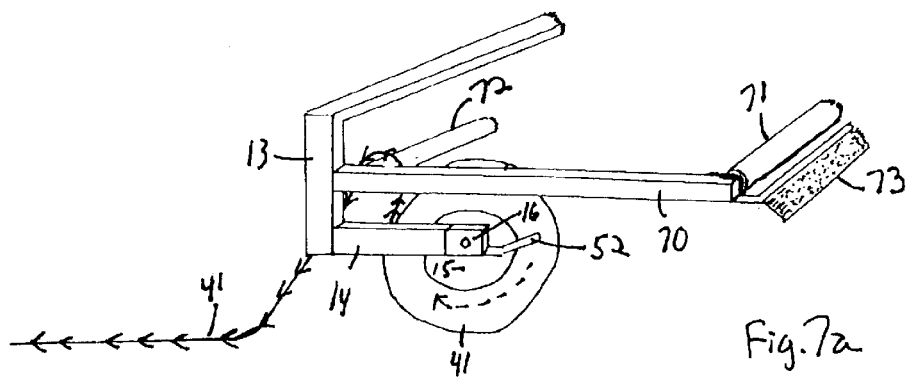
FIGS. 7a, 7b and 7c show an alternate embodiment of the frame having tension bars in front of and in back of the cover reel.
Figure 7B:
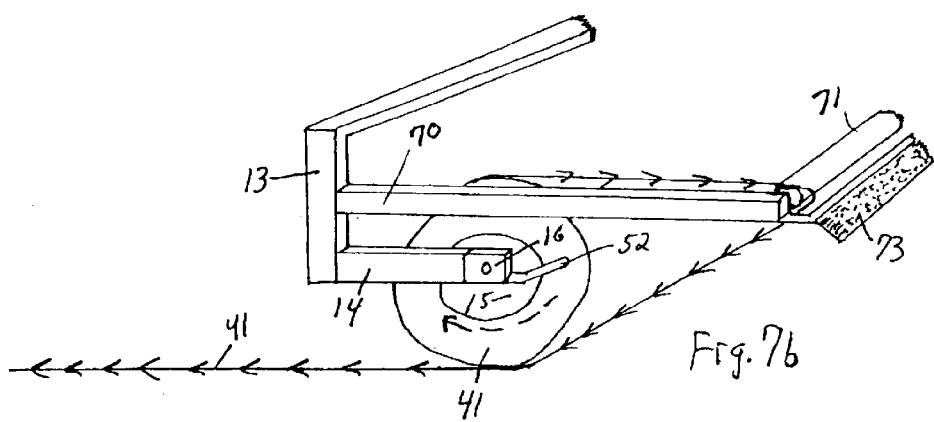
Figure 7C:
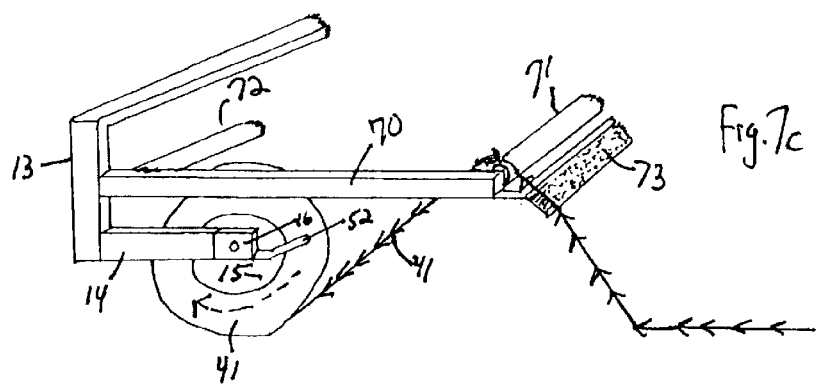

FIGS. 7a, 7b and 7c show a side view of frame 13 having tension bar arms 70 which support tension bar or roller 71 in front of cover reel 15 and tension bar 72 in back of cover reel 15. Tension bar rollers 71 and 72 are removably attached to tension bar arms 70. Tension bar 71 has a brush mechanism 73 to clean debris from the underside of ground cover 41. FIG. 7a shows the cover reel 15 and cover 41 in position for laying down cover 41 as prime mover 10 pushes frame 13 forward. Cover 41 is looped over tension bar 72 and unwinds from cover reel 15 in the direction shown by the arrows as cover reel 15 rotates clockwise. FIG. 7b shows an alternate method for laying down cover 41. Cover 41 is positioned over tension bar or roller 71 and under cover reel 15. Tension bar 72 may optionally be omitted and cover 41 may optionally be positioned over both tension bar 71 and brush mechanism 73. FIG. 7c shows the cover reel 15 and cover 41 in position for retrieving cover 41 as prime mover 10 pushes frame 13 forward. Cover 41 is looped over tension bar 71 and brush mechanism 73, is attached to cover reel 15, and winds onto cover reel 15 in the direction shown by the arrows as cover reel 15 rotates clockwise.

Figure 8:
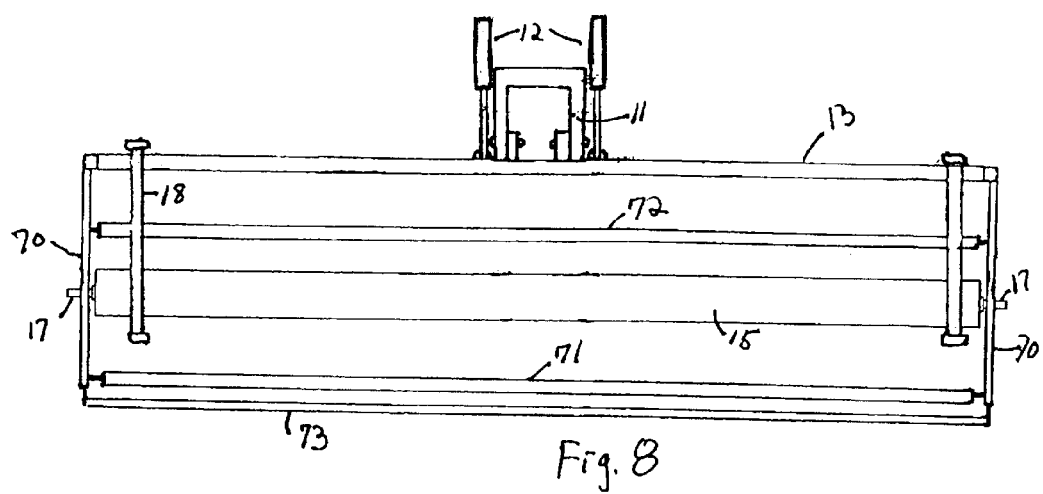
FIG. 8 provides a top view of the frame showing the position of the tension bars.

FIG. 8 shows a top view of frame 13 illustrating the position of tension bar arms 70 and tension bar roller 71 in front of cover reel 15 and tension bar roller 72 in back of cover reel 15, with brush mechanism 73 attached to tension bar arms 70 in front of tension bar 71. By looping ground cover 41 over tension bar 71 or 72, cover 41 will stretch slightly eliminating wrinkles and providing more uniform laying down of cover 41 onto the ground or winding onto cover reel 15 during retrieval. Cover 41 may also be laid down or retrieved without being looped over tension bars 71 and 72. Additional tension bar-rollers, crowned or uncrowned, may be added as necessary.

To protect the job site from rain, sleet, or snow, the ground cover must be laid out and retrieved quickly, preferably no less than 100 feet per minute. Furthermore, under windy conditions, heavy retaining material, such as, for example, chains, are required to hold the ground cover on the ground because the ground cover is made preferably of light weight material and has extensive surface area. Preferably, about ⅜ inch diameter chain weighing about 1.5 lbs. per foot of length should be used, but may range from about ¼ to about 1 inch in diameter and from about 0.5 to about 4.5 lbs. in weight per foot length. The advantage of linked chain type cable is that it may be easily wound around the powered chain reels or sprockets and will collect easily in the chain receptacles as it comes off the chain reel. Furthermore, linked chain is very flexible and will match the curvatures and irregularities of the ground surface, thereby pressing the ground cover into the curvatures and irregularities of the ground surface. The chains, thus, uniformly secure the cover along the length of the ground with no pockets between the cover and ground. If pockets form, the wind can enter under the cover and blow the cover up. The use of heavy linked chain prevents this from happening. Cables that are not linked like chain may be used if they will wind around a cable reel so that they may be pulled up by the cable reel, have sufficient weight per unit length, and will follow the contour of the ground. The chain may be made of any suitable metal, plastic, or ceramic but is made preferably of metal with a finish to prevent corrosion.

The width of the cover reel can be between about 5 feet, 6 inches to about 50 feet, 6 inches, but preferably about 20 feet, 6 inches. The width of the cover can be about 5 feet to about 50 feet, preferably about 20 feet. Up to 3,000 feet of cover or more can be wound on the cover reel so that up to 3,000 feet or more of road surface can be covered at one time. The cover can be partitioned into segments, such as, for example, 500 feet length segments, attached to each other by any suitable attaching mechanisms, preferably hook and pile (loop) arrangements, known, for example, as Velcro™. The cover preferably has hook and pile arrangements on each end and on each side. In this mode, a cover reel can contain several thousand feet of cover but sections of varying lengths of cover can be laid out, if desired, and disconnected from cover reel 15. Cover reel 15 can also have hook and pile arrangements for attaching the cover.

The cover should be made of a waterproof material with good flexibility, high tensile strength, and resistance to wear and tear. This type material is suitable for non-freezing weather. The cover should weigh between 70 and 100 lbs. per 1,000 sq. ft. with a thickness of 14 to 24 mils. The cover can also be made thicker, or with insulation, to insulate and protect roadways from freezing temperatures, enabling construction to continue in weather of 20 to 40° F., more or less.

The cover can further be made with electric or conductor wires or cables woven into the fabric (as in an electric blanket) in a grid or suitable design with power provided by battery, generator, or receptacle. The roadway surface could be, thus, heated to a depth of several feet providing protection against ice and snow and allowing construction to continue in sub-freezing weather for an indefinite period of time.

Roller 32 on top chain guide 18 is located as near as possible to cover reel 15 so that during retrieval of the chains while retrieving the cover, the chains are as close to the cover reel as possible to prevent the wind from blowing up under the cover between roller 32 and cover reel 15. Nevertheless, it may be desirable to attach a ground cover guide to top chain guide 18, similar to ground cover guide 50 shown in FIG. 5, to hold the edges of the ground cover adjacent to the ground between roller 32 and cover reel 15.

It may be feasible to power the cover reel to rotate clockwise or counterclockwise by using methods known in the art, for example, a motor, sprocket, and chain assembly to drive a sprocket attached to roller bearing and axle 17 on cover reel 15. For this embodiment, a motor and sprocket assembly may be attached to frame 13, for example, and a drive chain would extend from the motor and sprocket assembly to a sprocket attached to roller bearing and axle 17.

Ideally, the apparatus of the present invention for laying or retrieving a ground cover should accomplish several objectives simultaneously. These objectives include laying and retrieving the cover and anchor chain rapidly, about 100 feet per minute or more for several thousand feet, preventing wind from getting under the cover during laying and retrieving, preventing wrinkling and folding when reeling or unreeling the cover, and achieving straight and centered alignment with the road when laying the cover, and with the cover reel when retrieving the cover. These objectives are further achieved in an alternate embodiment of the ground cover dispensing and retrieving mechanism of the present invention illustrated in FIGS. 9a and 9b, 10, and 11.

Figure 9A:
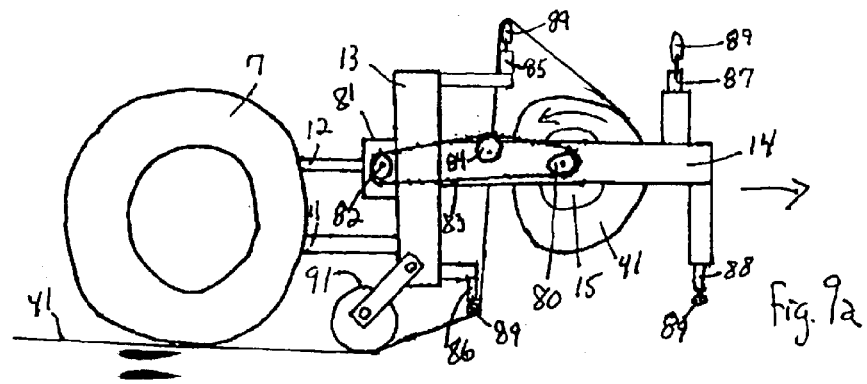
FIGS. 9a and 9b show an alternate embodiment of the ground cover dispensing and retrieving mechanism of the present invention to prevent backlash of the cover.

As illustrated in FIG. 9a, frame 13 and cover reel 15 have a power unit to rotate cover reel 15 clockwise or counter clockwise. The power unit, preferably, has a motor, sprocket, and chain assembly comprising a chain drive sprocket 80 on roller bearing or shaft 17 (see FIG. 1), a motor 81 with a chain drive sprocket 82 on frame 13, and a chain 83 connecting chain drive sprocket 80 with chain drive sprocket 82. Arm 14 on frame 13 can have an idler gear 84 positioned in the path of chain 83. Frame 13 also has an upper rear tension bar 85, and a lower rear tension bar 86, each reversibly attached to frame 13. Arm 14 on frame 13 has an upper front tension bar 87 and a lower front tension bar 88, each reversibly attached to arm 14. Tension bars 85, 86, 87 and 88 are constructed to have a series of rollers 89 positioned on a bearing shaft (see FIG. 10). Frame 13 also has a rotatably attached drag roller 91.

In FIG. 9a cover 41 is in position for being laid on the ground. Cover 41 passes over upper rear tension bar 85, downward under lower rear tension bar 86, and under drag roller 91. As prime mover 10 moves forward, cover 41 is reeled off the cover reel 15 and onto the ground as motor 81 rotates cover reel 15 counterclockwise with sufficient drag and tension provided by the power unit to prevent cover reel from free wheeling causing backlash, wrinkles and uneven lay down of cover. Drag roller 91 presses cover 41 uniformly to the ground preventing air pockets from forming beneath cover 41 as cover 41 is being laid on the ground.

Figure 9B:
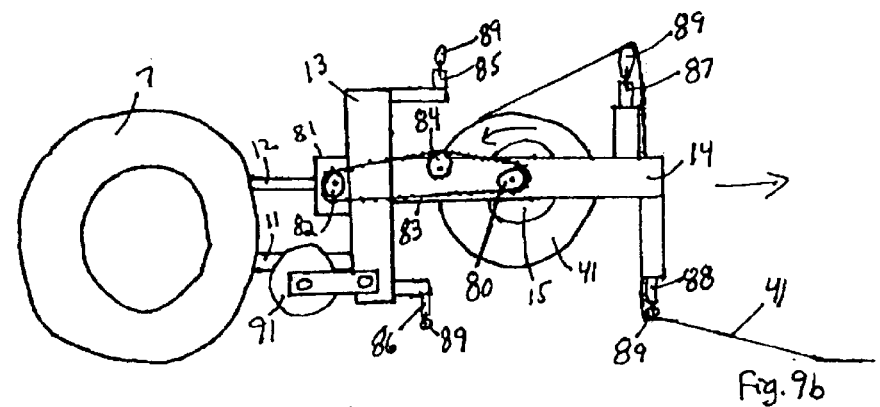

In FIG. 9b, cover 41 is in position for being taken up off the ground onto cover reel 15. Cover 41 passes under lower front tension bar 88 and over upper front tension bar 87. As prime mover 10 moves forward, cover 41 is reeled onto cover reel 15 as motor 81 rotates cover reel 15 counterclockwise. The power unit produces drag and tension and prevents free wheeling as described above. Tension bars 87 and 88 guide cover 41 straight onto cover reel 15. Unless cover 41 is centered, straight and tight, on cover reel 15 it will become slack and will backlash. Drag roller 91 is rotated upward off the ground when cover 41 is being reeled in.

Figure 10:
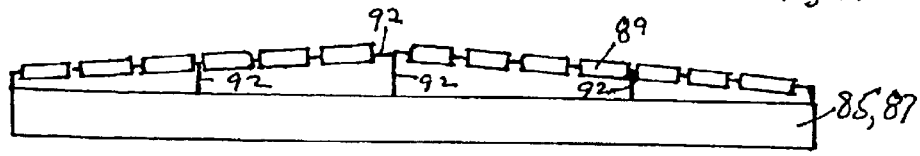
FIG. 10 illustrates crowned rollers on the tension bar to prevent wrinkles in the cover.

Upper front and upper rear tension bars 85, 87 preferably have rollers 89 that are crowned at the center of tension bars 85, 87 as shown in FIG. 10. The crown is formed by elevating bearing shaft 90 with mounts 91. When rollers 89 are crowned they are even more effective in preventing wrinkling and folding. The right combination of cover tension and degree of crown will provide the best removal of wrinkles when reeling cover 41 in or out using the power unit. If cover 41 is laid on the ground with wrinkles and air pockets it will pond water making it difficult to retrieve. Also, the water will spill onto the road bed.

Figure 11:
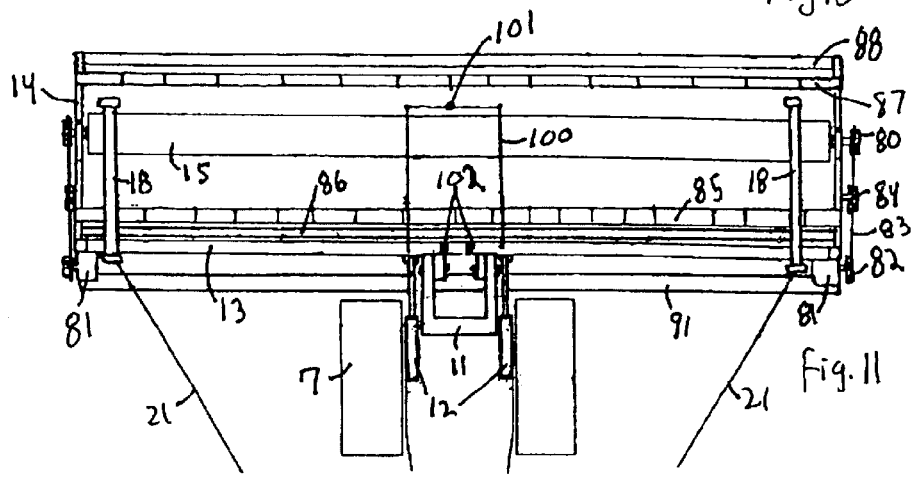
FIG. 11 shows a top view of the alternate embodiment of the present invention.

FIG. 11 shows a top diagrammatic view of the alternate embodiment of the present invention shown in FIGS. 9a and 9b. Motor 81 and drive sprocket 82 allow cover reel 15 to turn at an RPM and degree of torque so as to apply sufficient drag (similar to drag on a fishing reel) on cover reel 15 and cover 41 to prevent backlash of cover 41 and to spread cover 41 evenly on the ground as it is being reeled out. Likewise, motor 81 and drive sprocket 82 allow cover reel 15 to turn at an RPM and degree of torque sufficient to wind cover 41 tightly and uniformly on cover reel 15. The RPM and torque can be adjusted as needed by motor 81 to compensate for varying speed of prime mover 10 and varying diameter of cover 41 on cover reel 15, thereby providing any desired drag on cover reel 15 and in cover 41. The combination of this drag on cover 41 with the tension created by the tension bars permits laying and retrieving the cover rapidly, preferably not less than 100 feet per minute, for several thousand feet, prevents wind from getting under the cover during laying and retrieving, prevents wrinkling and folding when reeling or unreeling the cover, achieves straight and centered alignment with the road when laying the cover, and achieves straight and centered alignment with the cover reel when retrieving the cover.

FIG. 11 also illustrates an alternate center guide assembly 100 attached to frame 13. A rifle-type sight is created with a single front sight 101 and rear sight 102. Front sight 101 is constructed with a single ½ inch bar and the rear sight 102 is constructed with two ½ inch bars about 2 to 3 inches apart. In order to use the sight, front and rear sights are first centered on prime mover 10. A guideline is positioned on the center of the roadbed from starting point to ending point. A visible center line is created along the center of cover 41 from one end to the other. Visible center marks are also placed on frame 13, prime mover 10, and cover reel 15. The operator of prime mover 10 aligns the bar of front sight 101 between the bars of rear sight 102 with the guide line on the road bed or the center line on cover 41. This enables the operator to sight the cover centerline on the roadbed guideline when reeling out cover 41 and to sight the cover centerline to the center of cover reel 15 when reeling in cover 41.

Figure 12:
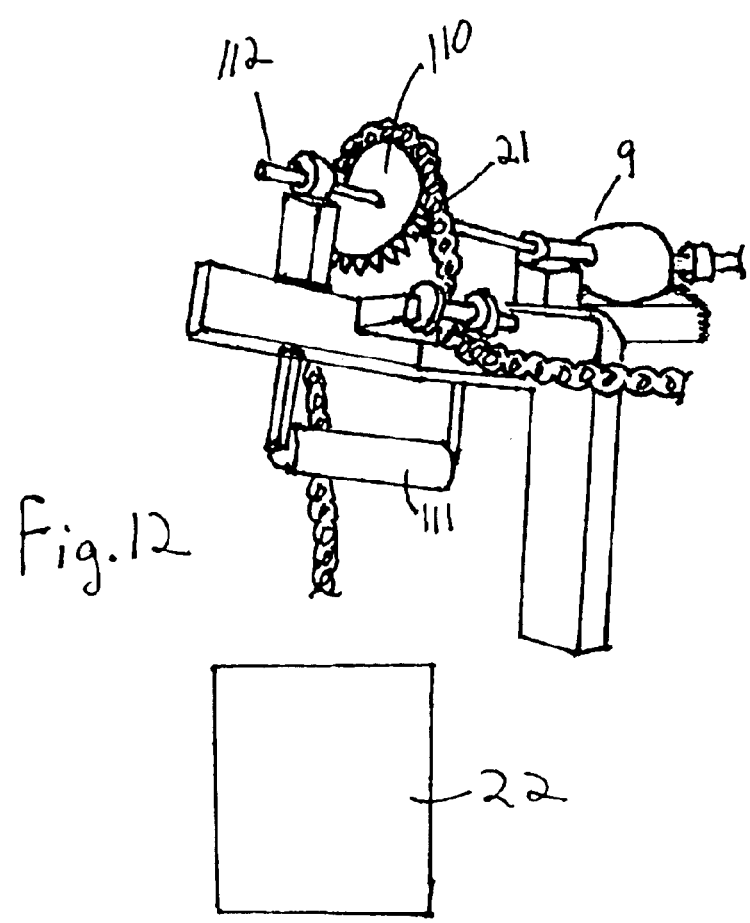
FIG. 12 shows an alternate embodiment of the retaining material and retrieving system in the retrieving mode.

FIG. 12 shows an alternate embodiment of the retaining material delivery and retrieving system for reeling in anchor chains 21 as cover 41 is being reeled in. This embodiment uses a chain reel sprocket 110 driven by motor, transmission, and shaft assembly 9 to rotate chain reel sprocket 110 at a rate which will pull in anchor chains 21 at a rate similar to the rate at which cover 41 is being retrieved onto cover reel 15. The anchor chains 21 are then deposited into chain receptacles 22. When anchor chains 21 are being laid down as cover 41 is being reeled out they are pulled out of chain receptacles 22 and pass over chain roller 111 instead of over chain reel sprocket 110. This system maintains a close connection between cover 41 and anchor chains 21 allowing cover 41 to be placed on the ground or retrieved from the ground without disruption by wind getting under the cover or blowing the cover off the ground.

Retaining material receptacles 22 hold a length of anchor chain approximately the same length as the corresponding cover section. For example, if cover reel 15 holds three 500 foot cover segments or sections, each chain receptacle 22 will be divided into three compartments, each holding approximately 500 feet of anchor chain. If 1500 feet of cover is reeled out from cover reel 15 to the ground in one 1500 foot length, then six 500 foot lengths of anchor chain segments are used to construct a pair of 1500 foot lengths of anchor chain, connecting the 500 foot lengths of anchor chain with removable chain links. Alternatively, if 1500 feet of cover is reeled out in three separate 500 foot sections, then three 500 foot pairs of anchor chains segments are reeled out separately with each 500 foot cover.

As described above, covers of varying lengths are anchored to the ground by laying two chains approximately the same length along each edge of the cover. Therefore, to reel in cover 41 on cover reel 15, one end of cover 41 is attached to cover reel 15 on front of prime mover 10 about 25 feet from chain reel sprockets 110 on rear of prime mover 10. To reel in chains 21 to chain boxes 22, one end of each chain 21 may be connected to one end of a guide rope or the like. The shaft 112 of motor, transmission, and shaft assembly 9 may be constructed to receive the other end of each guide rope. As shaft 112 is rotated by motor, transmission, and shaft assembly 9, the guide rope is reeled in, bringing chain 21 with it. As the prime mover 10 moves forward reeling in cover 41 on cover reel 15, the guide rope may be reeled in by shaft 112 until the end of each chain 21 attached to each guide rope reaches the proximity of chain reel sprocket 110. At this point, the guide ropes are disconnected from chains 21 and the end of each chain 21 is connected to chain reel sprockets 110 that reel chains 21 into chain receptacles 22 as prime mover 10 moves forward. The guide ropes may be wrapped around any suitable gathering device attached to shaft 112, and remain wrapped, ready for re-use. This procedure enables use of covers and chains approximately the same length—otherwise there would be an excess length of chain from cover reel 15 to chain reel sprocket 110 that would be difficult, if not impossible to handle. Although it is possible to pull the chains manually from cover reel 15 to chain reel sprockets 110 as prime mover 10 begins to reel in cover 41, this procedure would be slow, inefficient, and expensive.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, roller bearing and axle 17 may have an axle braking mechanism to prevent cover reel 15 from rotating. The front center guide assembly 19 may comprise a laser that reflects from a desired line on the ground or ground cover. The ground cover may be made of any suitable plastic or cloth. The cover reel may be made of any suitable metal or plastic. Mirrors may be placed in any suitable position to observe the cover reel or ground cover from the prime mover. The chain reels and receptacles may be placed at various positions on the prime mover or on frame 13. Retaining material and a retaining material delivery and retrieval system shown in FIGS. 1–5 can be used with the embodiments shown in FIGS. 9–12. The retaining material delivery and retrieval system can use a combination of chain reels and chain sprockets.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. An apparatus for laying or retrieving a ground cover, comprising:
   a) a prime mover;
   b) a cover dispensing and retrieving mechanism attached to said prime mover for laying out and retrieving a cover as said prime mover moves in an intended direction;
   c) retaining material carried by said prime mover to be laid on top of said cover as said cover is laid out onto the ground, thereby holding said cover down onto the ground; and
   d) a retaining material delivery and retrieving system for laying and retrieving said retaining material.

2. The apparatus according to claim 1 wherein said retaining material delivery and retrieving system comprises:
   a) a chain reel or chain sprocket or a combination thereof;
   b) chain guides;
   c) chain receptacles; and
   d) a motor, transmission, and shaft assembly to drive said chain reel or said chain sprocket.

3. The apparatus according to claim 1 wherein said ground cover dispensing and retrieving mechanism further comprises a cover reel attached to a collapsible frame, said collapsible frame being attached to said prime mover with raising and lowering means.

4. The apparatus according to claim 1 further comprising tension bars to maintain tension in said cover as said cover is being laid or retrieved to prevent wrinkles in said cover.

5. The apparatus according to claim 1 further comprising brush guides to clean debris from said cover.

6. The apparatus according to claim 1 further comprising a drag roller to press said cover on the ground and to prevent air pockets from forming beneath said cover as said cover is laid on the ground.

7. The apparatus according to claim 1 further comprising a center guide assembly to center said cover as said cover is being laid and retrieved.

8. The apparatus according to claim 1 wherein said retaining material is constructed from chains.

9. The apparatus according to claim 3 wherein said cover reel is powered to rotate by a power unit.

10. The apparatus according to claim 1 wherein said cover is from about 500 feet to about 2,500 feet in length.

11. The apparatus according to claim 3 wherein said cover is constructed in multiple segments reversibly attachable to each other and to said cover reel.

12. The apparatus according to claim 1 wherein said cover is constructed to insulate the ground.

13. The apparatus according to claim 1 wherein said cover is constructed to heat the ground.

14. The apparatus according to claim 10 wherein said chains weigh from about 0.5 lbs. to about 4.5 lbs. per foot of length and have a diameter from about 0.25 inches up to about 1 inch.

15. The apparatus according to claim 6 wherein said tension bars have crowned rollers.

16. The apparatus according to claim 10 wherein said chains are constructed in multiple segments.

17. An apparatus for laying or retrieving a ground cover, comprising:
   a) a prime mover having raising and lowering means and a frame attached to said raising and lowering means;
   b) a cover reel with a cover, said cover reel attached reversibly and rotatably to said frame;
   c) retaining material; and
   d) a retaining material delivery and retrieval system to lay retaining material on top of said cover as said prime mover lays out said cover from said cover reel onto the ground, and to retrieve said retaining material as said prime mover retrieves said cover onto said cover reel.

18. The apparatus according to claim 17 wherein said retaining material delivery and retrieving system comprises:
   a) a chain reel or chain sprocket or a combination thereof;
   b) chain guides;
   c) chain receptacles; and
   d) a motor, transmission, and shaft assembly to drive said chain reel or said chain sprocket.

19. The apparatus according to claim 17 further comprising tension bars to maintain tension in said cover as said cover is being laid or retrieved to prevent wrinkles in said cover.

20. The apparatus according to claim 17 further comprising brush guides to clean debris from said ground cover.

21. The apparatus according to claim 17 further comprising a drag roller to press said cover on the ground and prevent air pockets from forming beneath said cover as said cover is laid on the ground.

22. The apparatus according to claim 17 further comprising a center guide assembly to center said cover as said cover is being laid and retrieved.

23. The apparatus according to claim 17 wherein said retaining material is constructed from chains.

24. The apparatus according to claim 17 wherein said cover reel is powered to rotate by a power unit.

25. The apparatus according to claim 17 wherein said cover is up to about 500 feet to about 2,500 feet in length.

26. The apparatus according to claim 17 wherein said cover is constructed in multiple segments reversibly attachable to each other and to said cover reel.

27. The apparatus according to claim 17 wherein said cover is constructed to insulate the ground.

28. The apparatus according to claim 17 wherein said cover is constructed to heat the ground.

29. The apparatus according to claim 23 wherein said chains weigh from about 0.5 lbs. to about 4.5 lbs. per foot of length and have a diameter from about 0.25 inches up to about 1 inch.

30. The apparatus according to claim 19 wherein said tension bars have crowned rollers.

31. The apparatus according to claim 23 wherein said chains are constructed in multiple segments.

32. The apparatus according to claim 17 wherein lowering and raising means lower said frame by rotating said frame forward and raise said frame by rotating said frame backwards.

33. The apparatus according to claim 18 wherein said prime mover has a front end and a back end, with said frame being attached at said front end, and with said chain reels or said chain sprockets, said motor, shaft, and transmission assembly, and said chain receptacles being attached at said back end.

34. The apparatus according to claim 17 wherein said covet reel has roller bearing axles.

35. The apparatus according to claim 17 wherein said cover reel is about 5 feet, 6 inches to about 50 feet, 6 inches in width and said cover is about 5 feet to about 50 feet in width.

36. The apparatus according to claim 17 wherein said frame comprises rotatable sections or slidable sections, or a combination thereof.

37. A method for laying and retrieving ground covers, comprising the steps of:
   a) attaching retaining material to the ground and extending said retaining material to a retaining material delivery and retrieving system on a prime mover;
   b) lowering a cover reel having a cover to the ground with said prime mover;
   c) laying said cover on the ground by moving said cover reel in an intended direction with said prime mover to unwind said cover from said cover reel onto the ground; and
   d) laying said retaining material on top of said ground cover with said retaining material delivery and retrieving system, thereby retaining said cover onto the ground.

38. The method according to claim 37 further comprising the steps of:
   a) attaching said ground cover to said cover reel and lowering said cover reel to the ground with said prime mover;
   b) extending said retaining material from the ground to said retaining material delivery and retrieving system;
   c) retrieving said cover by moving said cover reel in an intended direction with said prime mover to wind said cover onto said cover reel; and
   d) retrieving said retaining material from the ground with said retaining material delivery and retrieving system.

39. The method according to claim 38 wherein the step of retrieving said retaining material is produced by one or more chain reels or chain sprockets driven by a motor, transmission, and shaft.

40. The method according to claim 38 wherein the step of retrieving said retaining material further comprises depositing said retaining material in retaining material receptacles.

41. The method according to claim 37 wherein the step of laying said cover further comprises the step of positioning said cover around one or more tension bars to stretch said cover to remove wrinkles from said cover.

42. The method according to claim 37 wherein the step of laying said cover further comprises the step of positioning said cover under a drag roller to press said cover onto the ground.

43. The method according to claim 37 wherein the step of laying said cover further comprises the step of centering said cover with a center guide assembly.

44. The method according to claim 38 wherein the step of retrieving said cover further comprises the step of positioning said cover around one or more tension bars to stretch said cover to remove wrinkles from said cover.

45. The method according to claim 38 wherein the step of laying said cover further comprises the step of positioning said cover over a brush mechanism to clean said cover.

46. The method according to claim 38 wherein the step of retrieving said retaining material is produced by one or more chain reels or chain sprockets driven by a motor, transmission, and shaft.

47. The method according to claim 38 wherein the step of retrieving said retaining material further comprises depositing said retaining material in retaining material receptacles.

48. The method according to claim 37 wherein the step of retrieving said cover further comprises the step of centering said cover with a center guide assembly.

49. The method according to claim 37 further comprising the step of insulating the ground with said ground cover.

50. The method according to claim 37 further comprising the step of heating the ground with said ground cover.

51. A method for laying and retrieving ground covers, comprising the steps of:
   a) attaching retaining material to the ground and extending said retaining material to a retaining material delivery and retrieving system on a prime mover;
   b) laying said cover on the ground by moving a cover reel in an intended direction with said prime mover and unwinding said cover from said cover reel onto the ground with a power unit; and
   c) laying said retaining material on top of said ground cover with said retaining material delivery and retrieving system, thereby retaining said cover onto the ground.

52. The method according to claim 51 further comprising the steps of:
   a) attaching said cover from the ground to said cover reel;
   b) extending said retaining material from the ground to said retaining material delivery and retrieving system;
   c) retrieving said cover by moving said cover reel in an intended direction with said prime mover and winding said cover onto said cover reel with said power unit; and
   d) retrieving said retaining material from the ground with said retaining material delivery and retrieving system.

53. The method according to claim 52 wherein the step of retrieving said retaining material is produced by one or more chain reels or chain sprockets driven by a motor, transmission, and shaft.

54. The method according to claim 52 wherein the step of retrieving said retaining material further comprises depositing said retaining material in retaining material receptacles.

55. The method according to claim 51 wherein the step of laying said cover further comprises the step of stretching said cover by positioning said cover around one or more tension bars to remove wrinkles from said cover.

56. The method according to claim 51 wherein the step of laying said cover further comprises the step of pressing said cover onto the ground by positioning said cover under a drag roller.

57. The method according to claim 51 wherein the step of laying said cover further comprises the step of centering said cover with a center guide assembly.

58. The method according to claim 52 wherein the step of retrieving said cover further comprises the step of stretching said cover by positioning said cover around one or more tension bars to remove wrinkles from said cover.

59. The method according to claim 52 wherein the step of retrieving said cover further comprises the step of cleaning said cover by positioning said cover over a brush mechanism.

60. The method according to claim 52 wherein the step of retrieving said cover further comprises the step of centering said cover with a center guide assembly.

61. The method according to claim 51 wherein the step of laying said cover further comprises the step of producing drag on said cover reel and said cover with said power unit.

62. The method according to claim 52 wherein the step of retrieving said cover further comprises the step of producing drag on said cover reel and said cover with said power unit.

63. The apparatus according to claim 51 further comprising the step of insulating the ground with said ground cover.

64. The apparatus according to claim 51 further comprising the step of heating the ground with said ground cover.

* * * * *